United States Patent
Young et al.

(10) Patent No.: US 11,153,102 B2
(45) Date of Patent: Oct. 19, 2021

(54) SYSTEMS AND METHODS TO IDENTIFY A CERTIFICATE AUTHORITY WITHIN AN OFFLINE MANUFACTURING FACILITY

(71) Applicant: DELL PRODUCTS, LP, Round Rock, TX (US)

(72) Inventors: Jason M. Young, Round Rock, TX (US); Marshal F. Savage, Austin, TX (US)

(73) Assignee: Dell Products L.P., Round Rock, TX (US)

(*) Notice: Subject to any disclaimer, the term of this patent is extended or adjusted under 35 U.S.C. 154(b) by 14 days.

(21) Appl. No.: 16/819,814

(22) Filed: Mar. 16, 2020

(65) Prior Publication Data
US 2021/0288821 A1 Sep. 16, 2021

(51) Int. Cl.
*H04L 9/32* (2006.01)
*H04L 9/30* (2006.01)
*H04L 9/08* (2006.01)

(52) U.S. Cl.
CPC .......... *H04L 9/3268* (2013.01); *H04L 9/0825* (2013.01); *H04L 9/0894* (2013.01); *H04L 9/3073* (2013.01); *H04L 9/3265* (2013.01); *H04L 2209/38* (2013.01)

(58) Field of Classification Search
CPC ... H04L 9/3268; H04L 9/0825; H04L 9/0894; H04L 9/3073; H04L 9/3265; H04L 2209/38; H04L 9/3247; H04L 63/0823; H04L 9/3263; H04L 9/321; H04L 9/007; H04W 12/069; G06F 21/57; G06F 21/572; G06F 21/575; G06F 21/6218; G06F 21/33; G06F 21/6227; G06F 21/6236; G06Q 20/38215; G06Q 20/3829
See application file for complete search history.

(56) References Cited

U.S. PATENT DOCUMENTS

| | | | |
|---|---|---|---|
| 8,195,933 B2 | 6/2012 | Benantar | |
| 10,461,943 B1* | 10/2019 | Norum | H04L 9/12 |
| 10,728,044 B1* | 7/2020 | Melo | H04L 9/0897 |
| 2010/0199099 A1 | 8/2010 | Wu | |
| 2018/0060608 A1* | 3/2018 | Holden | G06F 21/64 |
| 2018/0191508 A1* | 7/2018 | Scriber | G06F 21/57 |
| 2020/0052905 A1* | 2/2020 | Mathias | H04L 63/0823 |
| 2020/0186365 A1* | 6/2020 | Kumar | H04L 9/3247 |

* cited by examiner

*Primary Examiner* — Techane Gergiso
(74) *Attorney, Agent, or Firm* — Larson Newman, LLP

(57) ABSTRACT

A method includes generating a secure management mode public-private key pair; generating a certificate signing request, the certificate signing request including the secure management mode public key of the secure management mode public-private key pair, the certificate signing request including a common name associated with a trusted root certificate authority; sending the secure management mode certificate signing request to a signing server; receiving a signed certificate signed by a factory certificate authority, a public key certificate for the factory certificate authority, and a trust chain signed by the trusted root certificate authority; validating the signed certificate; and enabling a secure management mode.

18 Claims, 4 Drawing Sheets

SYSTEMS AND METHODS TO IDENTIFY A CERTIFICATE AUTHORITY WITHIN AN OFFLINE MANUFACTURING FACILITY

FIELD OF THE DISCLOSURE

The present disclosure generally relates to information handling systems, and more particularly relates to identifying a certificate authority within an offline manufacturing facility.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A method can include generating a secure management mode public-private key pair; generating a certificate signing request, the certificate signing request including the secure management mode public key of the secure management mode public-private key pair, the certificate signing request including a common name associated with a trusted root certificate authority; sending the secure management mode certificate signing request to a signing server; receiving a signed certificate signed by a factory certificate authority, a public key certificate for the factory certificate authority, and a trust chain signed by the trusted root certificate authority; validating the signed certificate; and enabling a secure management mode.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
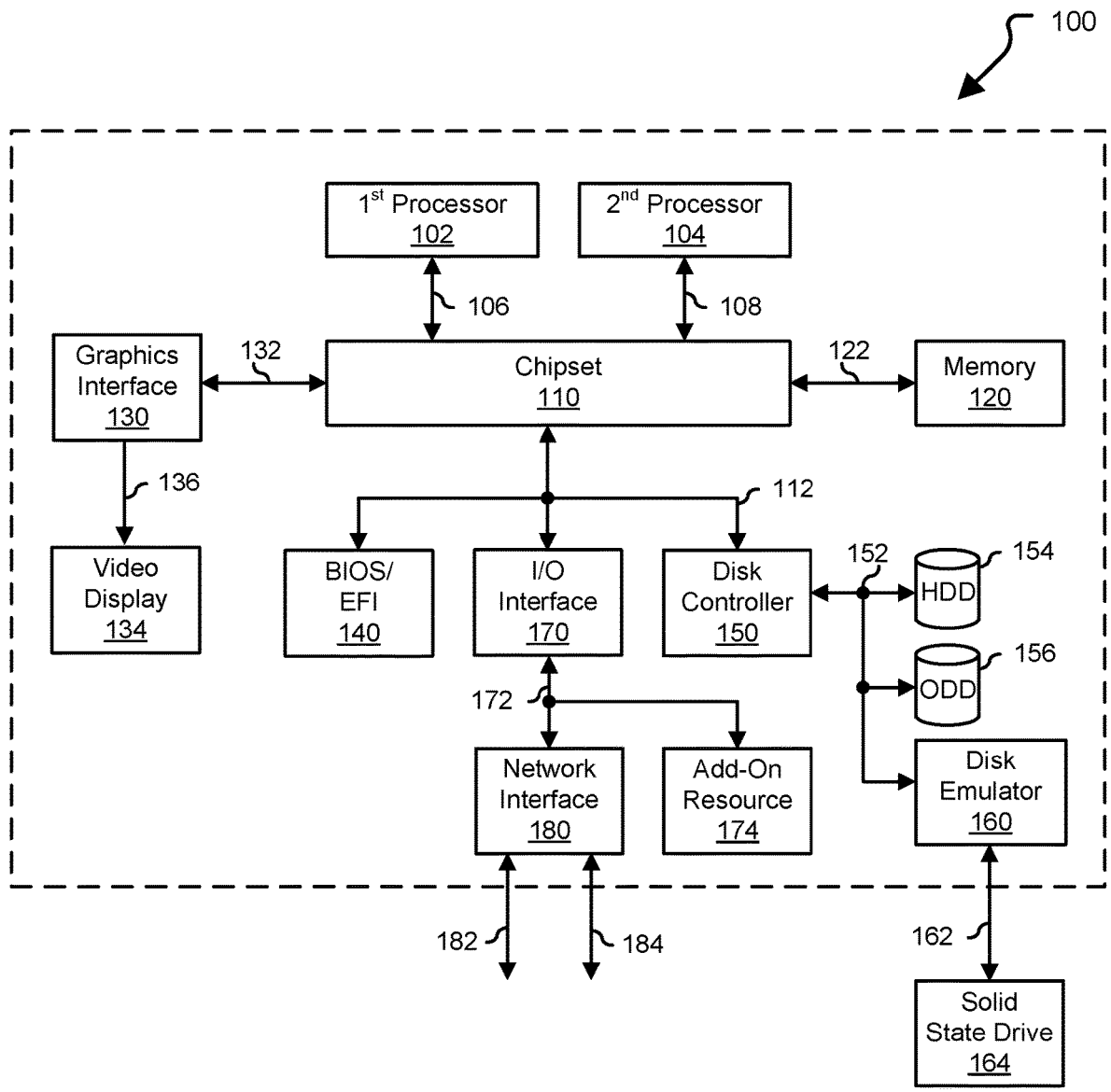
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

In various embodiments, factory processes can use privileged embedded firmware access to test and configure products within factories. The privileged embedded firmware access can be an out-of-band management platform such as a Baseboard Management Controller (BMC). The embedded firmware can prevent the use of these commands outside of authorized factories by using a public/private key encryption mechanism to authenticate enabling such functions. Hardware Security Modules (HSMs) can be used to protect certificates that are provisioned across the factories for the unique products and versions the factory has been authorized to manufacture. When the factory attempts to invoke a protected API, it can request a Certificate Signing Request (CSR) from the embedded firmware and then sign the CSR using a certificate signed by a Certificate Authority (CA) that the embedded firmware trusts.

The CA can be specific to each product and version of the embedded firmware. It can be problematic for the factory to identify which CA must be used when the factory may have hundreds of CA for hundreds of unique products and firmware versions. Each certificate created for the same unique product/version across all factories including redundant instances can have their own unique certificate serial number. Additionally, the list of certificate serial numbers can change every time there is a new CA created both for new factories or in the event a replacement is required (hardware failure). The embedded firmware cannot rely on a known list of certificates because any new or replacement certificates will be invalid as the firmware is locked at the time of release and usually has no awareness of new/replacement CAs added subsequent to the firmware lock.

In various embodiments, factories can be provisioned with CAs for a given unique product/version that have been signed by a Root CA which that product/version can use as a trust anchor. Each CA that is created across all factory instances can have an identical Common Name that is specific to the given product/version. The embedded firmware can be coded with the Common Name that has been provisioned in factories. Additionally, the embedded firmware can be coded with the public key of the root CA. When a factory requests authorization to privileged functions, the embedded firmware can input the Common Name into the CSR, such as by using an unstructured name attribute. The factory can parse this value from the CSR and sign it with the CA that matches the Common Name. The embedded firmware can then validate that it has been signed by a CA that was created by the Root CA it uses as its trust anchor.

Figure 2:
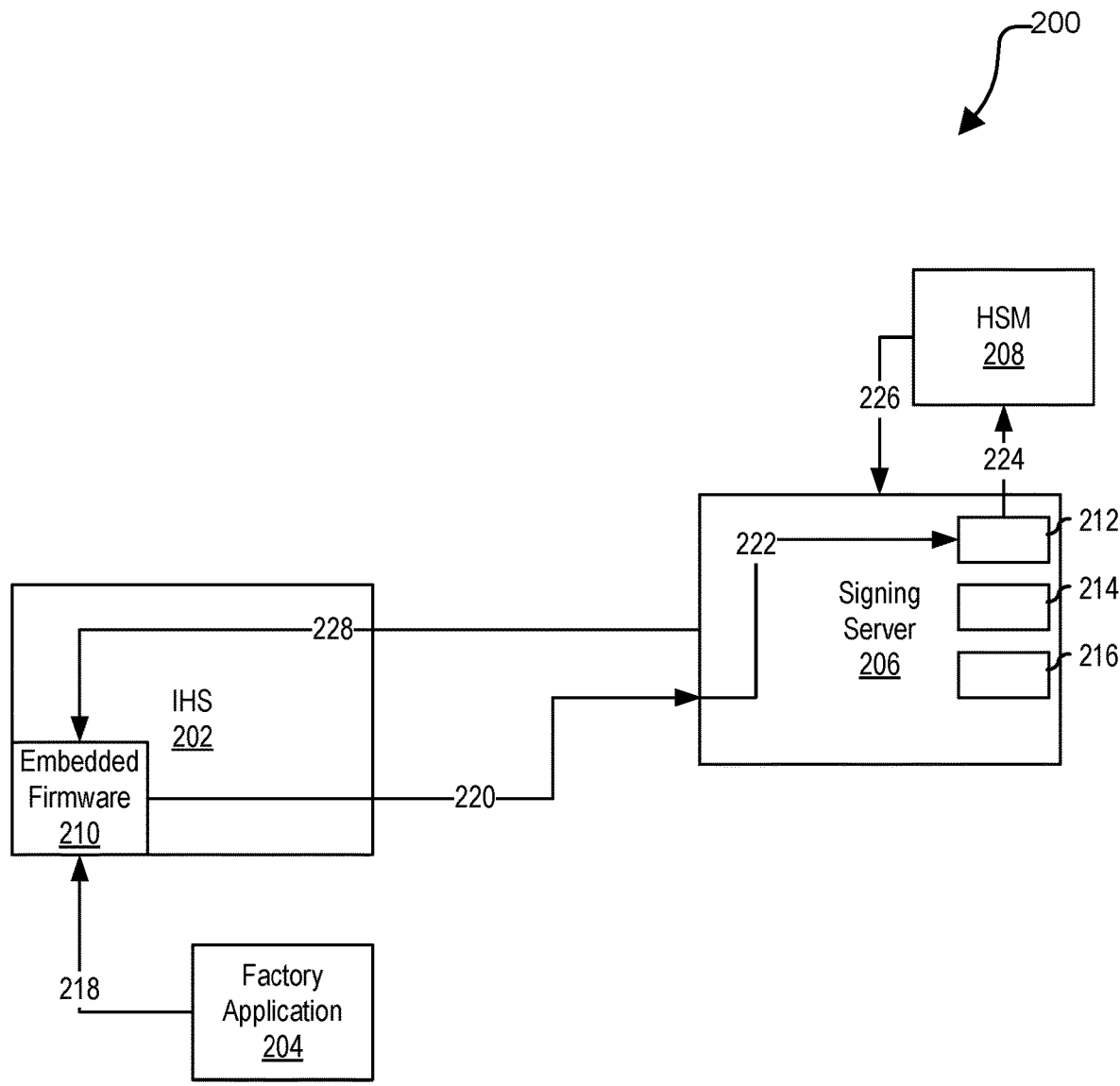
FIG. 2 is a block diagram illustrating a system for activating a secure manufacturing mode.

FIG. 2 illustrates a system for authorizing a secure manufacturing mode of an information handling system during assembly. The factory environment can include the information handling system or components thereof 202 that is being assembled, a factory application 204 for configuring the information handling system 202, a signing server 206, and a HSM 208.

The information handling system 202 can be a completely assembled system undergoing final testing and configuration before being sent to the customer or end user. Alternatively, the information handling system can be in various stages of assembly with components missing and be undergoing testing and configuration prior to final assembly of the missing components. For example, the information handling system can be a motherboard including a processor, memory, and an embedded firmware 210, such as an out-of-band management system like a BMC, prior to the addition of a graphics interface, input/output devices, and storage.

The factory application 204 can be an application running on the information handling system 202 to allow for configuration of the system 202, or can be on a separate system in communication with the information handling system 202 and capable of remotely configuring the information handling system 202. The signing server 206 can maintain a list of CAs and their Common Names for which the factory is authorized. Additionally, the signing server 206 can maintain the certificate chains 212, 214, and 216 for each of the authorized CAs. The certificate chains can each be signed by a root CA recognized by the firmware of a specific product/version.

In various embodiments, there can be a common root CA for all certificate chains. Alternatively, product/versions can be grouped with each group having a different root CA. For example, products/versions having an embedded firmware that was locked within a first time period can have a different root CA than products/versions having an embedded firmware that was locked within a second time period. In this way, the risks associated with a compromise of the root CA private key can be limited to a subset of products/versions and/or privileged functionality. In an extreme case, each product/version can have a unique root CA.

HSM 208 can securely maintain private keys for the authorized CAs and can use the private keys to sign certificates. The factory application 204 can request the embedded firmware 210 of the information handling system 202 create a CSR (arrow 218). The CSR can be sent to the signing server 206 (arrow 220). The CSR can identify the authorized CA matching the Common Name provided in the CSR (arrow 222) and request the HSM 208 to encrypt data using the private key of the authorized CA to sign the certificate (arrow 224). The HSM can send the encrypted data back to the signing server (arrow 226), which can then send the signed certificate, the public key of the authorized CA, and the trust chain signed by the root CA back to the information handling system (arrow 228). The embedded firmware 210 can verify the signed certificate and the trust chain before enabling secure management mode.

Figure 3:
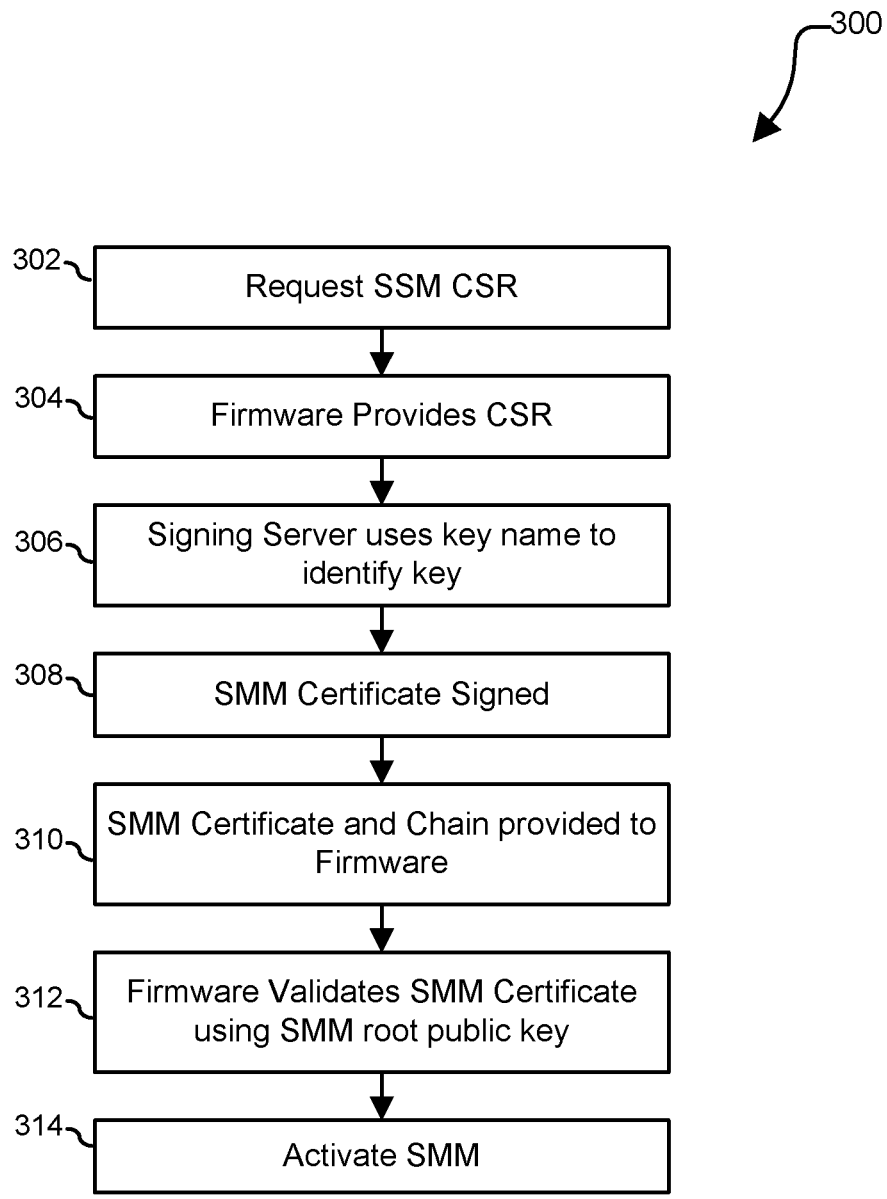
FIG. 3 is a flow diagram illustrating a method of activating a secure manufacturing mode.

FIG. 3 illustrates a method of activating a secure manufacturing mode. At 302, the firmware of the information handling system can receive a request for a secure manufacturing mode certificate signing request (CSR), such as from a factory application needing to configure the information handling system using a secure manufacture mode. The firmware can generate the CSR in response to receiving the request. The CSR can include a current time, a hardware identifier such as a MAC address, and a Trusted Signing Certificate name. In various embodiments, the CSR can be compliant with the Internet X.509 Certificate Request Message Format.

In various embodiments, the firmware can create a public-private key pair for the secure manufacturing mode (SMM). The firmware can include the SMM public key in the CSR and can encrypt and store the private key using a hardware root key unique to the information handling system. In various embodiments, the SMM public/private key pair can be used for encrypted communication between the embedded firmware and the factory application once the SMM is activated.

At 304, the CSR can be provided to the signing server. In various embodiments, the firmware can provide the CSR to the requestor, such as a factory application, and the requestor can forward the CSR to the signing server. At 306, the signing server can use the Trusted Signing Certificate Common Name to identify which certificate authority key is required to sign the certificate. In various embodiments, the signing server may look up the certificate serial number based on the Common Name provided by the embedded firmware. The signing server can initiate creation of the SMM certificate and then send data to the HSM for signing. At 308, the HSM can encrypt the data using the private key associated with the certificate serial number. The signing server can complete the signed SMM certificate.

At 310, the signed SMM certificate, the authorized CA public key, and the trust chain signed by the root CA recognized by the embedded firmware can be provided to the embedded firmware. In various embodiments, the signing server can send the signed SMM certificate, the authorized CA public certificate, and the trust chain to the factory application and the factory application can send the signed SMM certificate, the authorized CA public certificate, and the trust chain to the embedded firmware. At 312, the embedded firmware can validate the signed SMM certificate. The embedded firmware can use the authorized CA public key to decrypt the data encrypted by the HSM to verify the signature of the signed SMM certificate. Additionally, the embedded firmware can use the public key of the root CA to verify the trust chain. In various embodiments the public key of the root CA can be encoded into the firmware. The embedded firmware can further verify the SMM certificate by checking the hardware identifier and the time match the values from the CSR. Additionally, the embedded firmware can decrypt the SMM private key to verify the SMM public key included in the CSR corresponds to the stored SMM private key.

After verifying the authenticity of the signed SMM certificate, the embedded firmware can activate SMM, as shown at 314. Once activated, the factory application can test and modify the operation of the information handling system in accordance with the customer or end user requirements. For example, the SMM can enable additional diagnostic ports for testing, reprogram identity data such as serial numbers, select a brand personality for the BIOS such that particular brand logos and/or color schemes are displayed when powering on the information handling system, configure liquid cooling, and various other configurations that can only be set or changed in the factory.

In various embodiments, once SMM is activated, privileged commands from the factory application to the information handling system can be encrypted using symmetric key encryption. For example, the factory application can provide a factory application public key to the embedded firmware along with the SMM certificate. The factory application can sign privileged commands using the corresponding private key. Additionally, the factory application can encrypt the command using the SMM public key provided by the embedded firmware. Once received, the embedded firmware can decrypt the privileged command using the SMM private key and verify the signature using the public key provided by the factory application.

Figure 4:
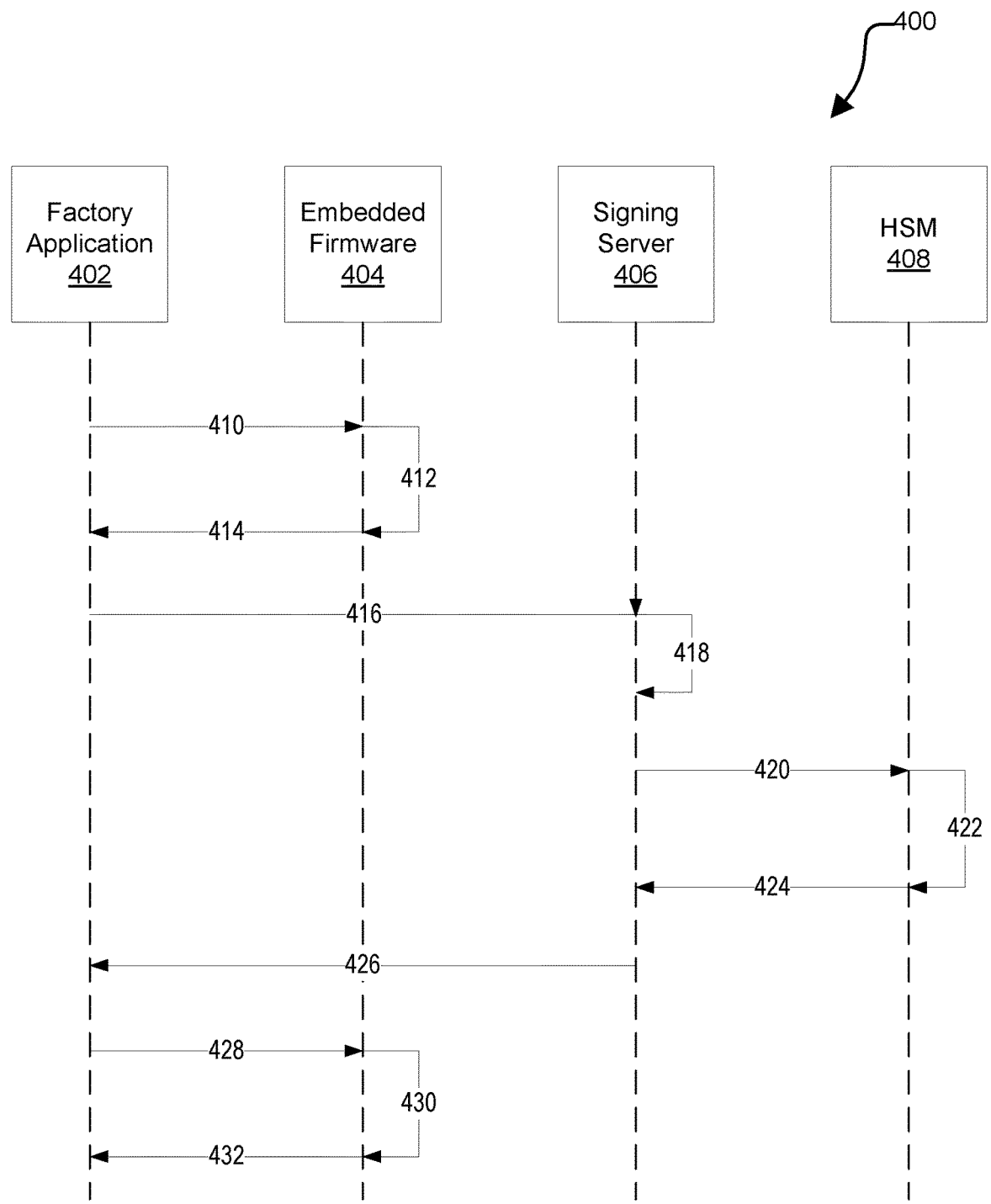
FIG. 4 is a diagram illustrating a method of activating a secure manufacturing mode.

FIG. 4 is a block diagram illustrates the flow of information among the factory application 402, the embedded firmware 404, signing server 406 and the HSM 408 during the process of enabling SMM. At 410, the factory application 402 can request the embedded firmware 404 to create an SMM CSR. At 412, the embedded firmware 404 can create the SMM CSR, and, at 414, can send the SMM CSR to the factory application 402.

At 416, the factory application 402 can send the SMM CSR to the signing server 406. At 418, the signing server 406 can parse the SMM CSR, identify the authorized CA, and initiate creation of the signing certificate. At 420, the signing server 406 can send data to be encrypted to the HSM 408. At 422, the HSM 408 can use the private key of the authorized CA to encrypt the data, and, at 424, the HSM 408 can return the encrypted data to the signing server 406.

At 426, the signing server 406 can send the signed certificate, the authorized CA public key, and the trust chain to the factory application 402. At 428, the factory application 402 can provide the signed certificate, the authorized CA public key, and the trust chain to the embedded firmware 404. At 430, the embedded firmware 404 can verify the signed certificate, and at 432, the embedded firmware 404 can enable SMM and notify the factory application that SMM is successful.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    generating a secure management mode public-private key pair by a firmware of an information handling system;
    generating, by the firmware of the information handling system, a certificate signing request, the certificate signing request including the secure management mode public key of the secure management mode public-private key pair;
    sending the secure management mode public key with the certificate signing request to a signing server, the signing server configured to identify a factory certificate authority based on a common name, sign a certificate using the factory certificate authority, and provide a signed certificate, a public key for the factory certificate authority, and a trust chain signed by a trusted root certificate authority;
    receiving the signed certificate signed by the factory certificate authority, the public key certificate for the factory certificate authority, and the trust chain signed by the trusted root certificate authority;
    validating the signed certificate by the firmware of the information handling system; and
    enabling a secure management mode of the information handling system.

2. The method of claim 1, wherein the common name is associated with the trusted root certificate authority.

3. The method of claim 2, further comprising encrypting a private key of the secure management mode public-private key pair and storing the encrypted private key.

4. The method of claim 3, wherein encrypting the private key includes encrypting the private key using a hardware root key.

5. The method of claim 1, wherein secure management mode enables activating diagnostic ports, reprogramming of identity data, selecting a brand personality, or configuring liquid cooling.

6. A method comprising:
    receiving a certificate signing request from a firmware of an information handling system, the certificate signing request including a common name associated with a trusted root certificate authority;
    identifying a factory certificate authority based on the common name;
    signing a certificate using the factory certificate authority including sending data to a hardware security module and receiving encrypted data back from the hardware security module, the data including a factory certificate authority identifier; and
    providing the signed certificate, a public key for the factory certificate authority, and a trust chain signed by the trusted root certificate authority to the information handling system to activate a secure management mode of the information handling system.

7. The method of claim 6, wherein identifying the factory certificate authority includes looking up the factory certificate authority identifier from a list of common name-factory certificate authority identifier pairs.

8. The method of claim 6, wherein the hardware security module includes private keys for a plurality of factory certificate authorities including the factory certificate authority.

9. The method of claim 6, wherein secure management mode enables activating diagnostic ports, reprogramming of identity date, selecting a brand personality, or configuring liquid cooling.

10. A system comprising:
an information handling system having a secure management mode, the information handling system including:
an out-of-band management controller configured to:
store a common name and a public key of a trusted root certificate authority in firmware;
generate a certificate signing request, the certificate signing request including the common name;
send the certificate signing request to a signing server;
receive a certificate signed by a factory certificate authority, a public key for the factory certificate authority, and a trust chain signed by the trusted root certificate authority;
validate the trust chain using the public key of the trusted root certificate authority and the signed certificate using the public key of the factory certificate authority; and
enable secure management mode of the information handling system; and
the signing server including:
a storage configured to store a table of common names and factory certificate authority identifiers; and
a processor configured to:
receive the certificate signing request;
identify the factory certificate authority based on the common name;
sign a certificate using the factory certificate authority; and
provide the signed certificate, a public key for the factory certificate authority, and a trust chain signed by the trusted root certificate authority to the information handling system.

11. The system of claim 10, wherein the out-of-band management controller is further configured to generate a secure management mode public-private key pair.

12. The system of claim 11, wherein the out-of-band management controller is further configured to encrypt a private key of the secure management mode public-private key pair and store the encrypted private key.

13. The system of claim 11, wherein the out-of-band management controller is further configured to encrypt the private key of the secure management mode public-private key pair using a hardware root key.

14. The system of claim 10, wherein the signing server is further configured to identify the factory certificate authority by looking up a factory certificate authority identifier from a list of common name-factory certificate authority identifier pairs.

15. The system of claim 10, wherein the signing server is further configured to sign the certificate by sending data to a hardware security module and receiving encrypted data back from the hardware security module.

16. The system of claim 15, wherein the signing server is further configured to provide the factory certificate authority identifier to the hardware security module.

17. The system of claim 15, wherein the hardware security module includes private keys for a plurality of factory certificate authorities including the factory certificate authority.

18. The system of claim 10, wherein secure management mode enables activating diagnostic ports, reprogramming of identity date, selecting a brand personality, or configuring liquid cooling.

* * * * *